(12) United States Patent
Yamada et al.

(10) Patent No.: US 10,308,359 B2
(45) Date of Patent: Jun. 4, 2019

(54) MOVING DEVICE, METHOD OF CONTROLLING MOVING DEVICE AND STORAGE MEDIUM

(71) Applicant: CASIO COMPUTER CO., LTD., Shibuya-ku, Tokyo (JP)

(72) Inventors: Shunsuke Yamada, Tachikawa (JP); Takahiro Mizushina, Kawagoe (JP); Hideaki Matsuda, Tokyo (JP); Toshihiro Takahashi, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 60 days.

(21) Appl. No.: 15/608,449

(22) Filed: May 30, 2017

(65) Prior Publication Data

US 2017/0369165 A1 Dec. 28, 2017

(30) Foreign Application Priority Data

Jun. 23, 2016 (JP) .................................. 2016-124929
Feb. 23, 2017 (JP) .................................. 2017-032100

(51) Int. Cl.
*B64C 39/02* (2006.01)
*G05D 1/10* (2006.01)
(Continued)

(52) U.S. Cl.
CPC .............. *B64C 39/024* (2013.01); *B64D 47/08* (2013.01); *G05D 1/0094* (2013.01);
(Continued)

(58) Field of Classification Search
CPC ............ H04N 5/23245; H04N 5/23293; H04N 5/2352; B64C 39/024; B64C 2201/141;
(Continued)

(56) References Cited

U.S. PATENT DOCUMENTS

2016/0101856 A1 4/2016 Kohstall
2016/0255249 A1* 9/2016 Pan ....................... G03B 17/561
348/373

(Continued)

FOREIGN PATENT DOCUMENTS

JP 2004118087 A 4/2004
JP 2005269413 A 9/2005
(Continued)

OTHER PUBLICATIONS

Japanese Office Action dated Nov. 7, 2017 issued in counterpart Japanese Application No. 2017-032100.

*Primary Examiner* — Mussa A Shaawat
(74) *Attorney, Agent, or Firm* — Holtz, Holtz & Volek PC

(57) ABSTRACT

A moving device includes an imaging unit, an acquiring unit, a determining unit and an imaging control unit. The acquiring unit is configured to acquire a state at a time when the moving device is released from a user. The determining unit is configured to determine an imaging manner to control the imaging unit after the time of being released, based on the state acquired by the acquiring unit. The imaging control unit is configured to control the imaging unit in the imaging manner determined by the determining unit.

13 Claims, 9 Drawing Sheets

(51) Int. Cl.
*H04N 5/232* (2006.01)
*G05D 1/00* (2006.01)
*H04N 5/235* (2006.01)
*B64D 47/08* (2006.01)

(52) U.S. Cl.
CPC ....... *H04N 5/2352* (2013.01); *H04N 5/23245* (2013.01); *H04N 5/23293* (2013.01); *B64C 2201/127* (2013.01); *B64C 2201/141* (2013.01); *B64C 2201/146* (2013.01)

(58) Field of Classification Search
CPC ........ B64C 2201/146; B64C 2201/127; G05D 1/0094; B64D 47/08
See application file for complete search history.

(56) References Cited

U.S. PATENT DOCUMENTS

| | | | |
|---|---|---|---|
| 2017/0132808 A1* | 5/2017 | Heinonen | G01J 1/44 |
| 2017/0320569 A1* | 11/2017 | Gordon | B64C 39/024 |
| 2017/0339337 A1* | 11/2017 | Kim | B64C 39/024 |
| 2018/0022455 A1* | 1/2018 | McCaslin | B64D 1/12 |
| 2018/0217589 A1* | 8/2018 | Kim | G05D 1/00 |
| 2018/0227469 A1* | 8/2018 | Osanai | H04N 5/2254 |

FOREIGN PATENT DOCUMENTS

| | | | |
|---|---|---|---|
| JP | 2008120294 A | 5/2008 | |
| JP | 2012156683 A | 8/2012 | |

* cited by examiner

FIG. 8

| SHUTTER SPEED (SECONDS) | APERTURE | 2.0 | 2.8 | 4.0 | 5.6 | 8.0 | 11 | 16 | 22 | 32 |
|---|---|---|---|---|---|---|---|---|---|---|
| 1 | 1.0 | 2 | 3 | 4 | 5 | 6 | 7 | 8 | 9 | 10 |
| 1/2 | 1.4 | 3 | 4 | 5 | 6 | 7 | 8 | 9 | 10 | 11 |
| 1/4 | 2.0 | 4 | 5 | 6 | 7 | 8 | 9 | 10 | 11 | 12 |
| 1/8 | 2.8 | 5 | 6 | 7 | 8 | 9 | 10 | 11 | 12 | 13 |
| 1/15 | 4.0 | 6 | 7 | 8 | 9 | 10 | 11 | 12 | 13 | 14 |
| 1/30 | 5.6 | 7 | 8 | 9 | 10 | 11 | 12 | 13 | 14 | 15 |
| 1/60 | 8.0 | 8 | 9 | 10 | 11 | 12 | 13 | 14 | 15 | 16 |
| 1/125 | 11 | 9 | 10 | 11 | 12 | 13 | 14 | 15 | 16 | 17 |
| 1/250 | 16 | 10 | 11 | 12 | 13 | 14 | 15 | 16 | 17 | 18 |
| 1/500 | 22 | 11 | 12 | 13 | 14 | 15 | 16 | 17 | 18 | 19 |
| 1/1000 | 32 | 12 | 13 | 14 | 15 | 16 | 17 | 18 | 19 | 20 |
| 1/2000 | 32 | 13 | 14 | 15 | 16 | 17 | 18 | 19 | 20 | 21 |
| 1/4000 | 32 | 14 | 15 | 16 | 17 | 18 | 19 | 20 | 21 | 22 |
| 1/8000 | 32 | 15 | 16 | 17 | 18 | 19 | 20 | 21 | 22 | 23 |

FIG. 9

| | | SHUTTER SPEED (SECONDS) |
|---|---|---|
| INITIAL VELOCITY $V_0$ | Vth1 ~ Vth2 | 1 |
| | Vth2 ~ Vth3 | 1/2 |
| | Vth3 ~ Vth4 | 1/4 |
| | Vth4 ~ Vth5 | 1/8 |
| | Vth5 ~ Vth6 | 1/15 |
| | Vth6 ~ Vth7 | 1/30 |
| | Vth7 ~ Vth8 | 1/60 |
| | Vth8 ~ Vth9 | 1/125 |
| | Vth9 ~ Vth10 | 1/250 |
| | Vth10 ~ Vth11 | 1/500 |
| | Vth11 ~ Vth12 | 1/1000 |
| | Vth12 ~ Vth13 | 1/2000 |

MOVING DEVICE, METHOD OF CONTROLLING MOVING DEVICE AND STORAGE MEDIUM

CROSS-REFERENCE TO RELATED APPLICATION

This application is based upon and claims the benefit of priority under 35 USC 119 of Japanese Patent Application Nos. 2016-124929 filed on Jun. 23, 2016, and 2017-032100 filed on Feb. 23, 2017, the entire disclosure of which, including the description, claims, drawings, and abstract, is incorporated herein by reference in its entirety.

BACKGROUND OF THE INVENTION

1. Field of the Invention

The present invention relates to a moving device which flies without a pilot and performs imaging from the air if it is released from a user's hand or the like.

2. Description of the Related Art

Moving devices configured by attaching digital cameras to small pilotless moving devices referred to collectively as so-called drones have started to spread (see JP-A-2004-118087, JP-A-2005-269413, JP-A-2012-156683, and JP-A-2008-120294 for instance). The small pilotless moving devices each have, for example, four propelling devices using rotor blades configured to be driven by motors, and the moving devices and the digital cameras are operated by timers or are remotely operated in various manners such as a wireless manner, thereby performing imaging from high positions beyond people's reach.

SUMMARY OF THE INVENTION

According to an example of the disclosure, a moving device includes an imaging unit, an acquiring unit, a determining unit and an imaging control unit. The acquiring unit is configured to acquire a state at a time when the moving device is released from a user. The determining unit is configured to determine an imaging manner to control the imaging unit after the time of being released, based on the state acquired by the acquiring unit. The imaging control unit is configured to control the imaging unit in the imaging manner determined by the determining unit.

BRIEF DESCRIPTION OF THE DRAWINGS

FIG. 8 is a view illustrating an example of a table representing the relation of exposure, shutter speed, and aperture.

FIG. 9 is a view illustrating an example of an initial-velocity shutter-speed correspondence table which is generated in the different embodiment.

DETAILED DESCRIPTION OF THE PREFERRED EMBODIMENTS

Hereinafter, an embodiment of the present invention will be described in detail with reference to the accompanying drawing. The present embodiment is for acquiring a state when a moving device is released from a holder (a user), for example, when the moving device is thrown by a thrower, and determining an imaging manner to control an imaging unit after the time of having been released, and controlling the imaging unit in the determined imaging manner. Specifically, the present embodiment is for making it possible to drive propelling units of the moving device after the moving device has been thrown, such that the moving device flies, and control the imaging manner of the imaging unit of the moving device. More specifically, the present embodiment is for recognizing that a moving device has been thrown by a user, and acquiring a state at the time of having been thrown, based on sensor data, by calculation, and comparing individual parameters with thresholds, thereby estimating the throwing manner of the user, and performing a transition to an imaging manner based on the throwing manner, and performing imaging according to the corresponding imaging manner.

Figure 1:
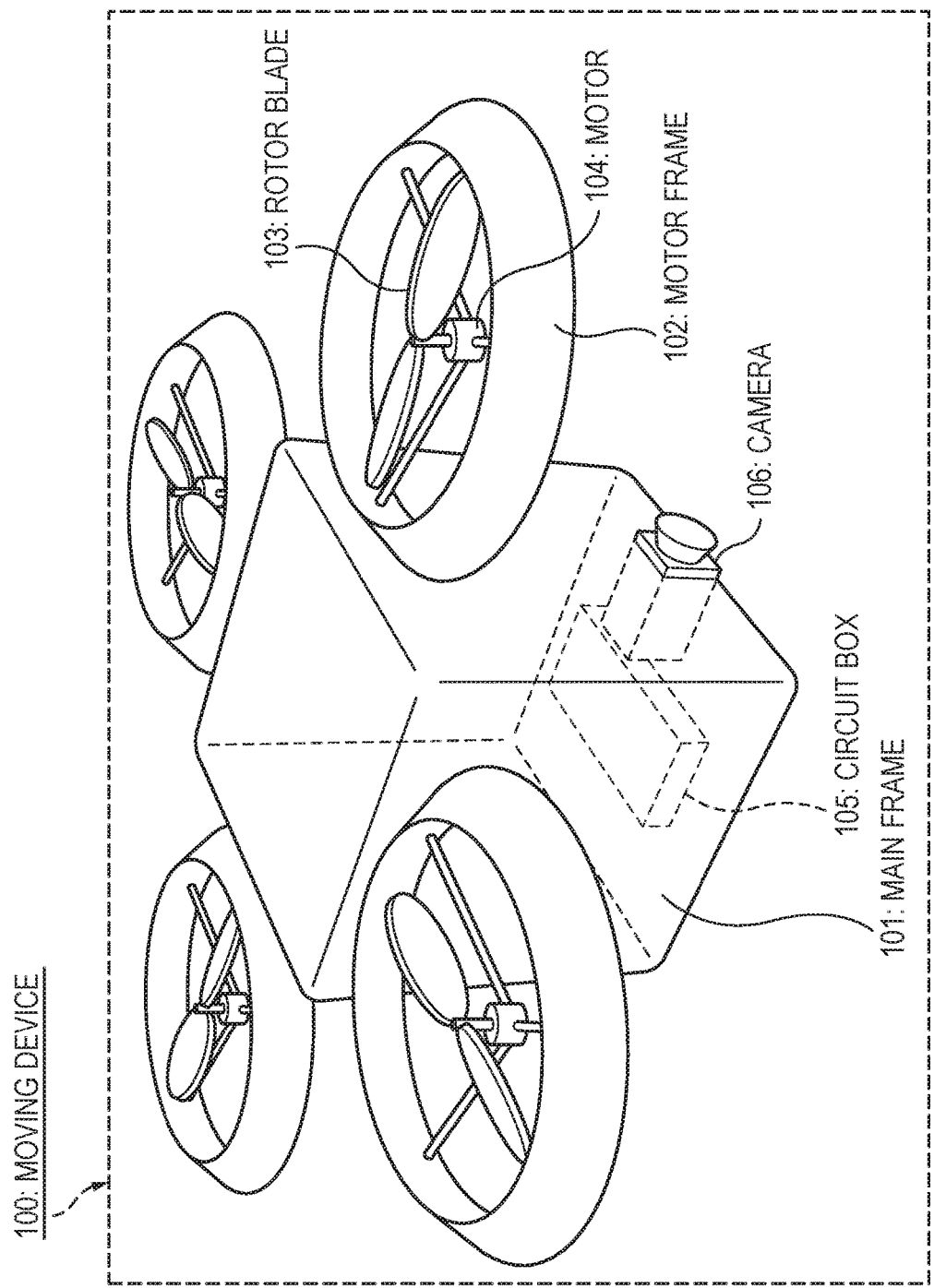
FIG. 1 is a view illustrating an example of the structure of motor frames of a moving device according to an embodiment.

FIG. 1 is a view illustrating an example of the external appearance of a moving device 100 according to the present embodiment.

Four circular motor frames (supporting units) 102 are attached to a main frame 101. The motor frames 102 are configured to be able to support motors 104, and rotor blades 103 are fixed on the motor shafts of the motors 104. The four pairs of motors 104 and rotor blades 103 constitute propelling units.

The main frame 101 contains a circuit box 105, which contains motor drivers for driving the motors 104, a controller, various sensors, and so on. On the lower portion of the main frame 101, a camera 106 is attached as an imaging unit.

Figure 2:
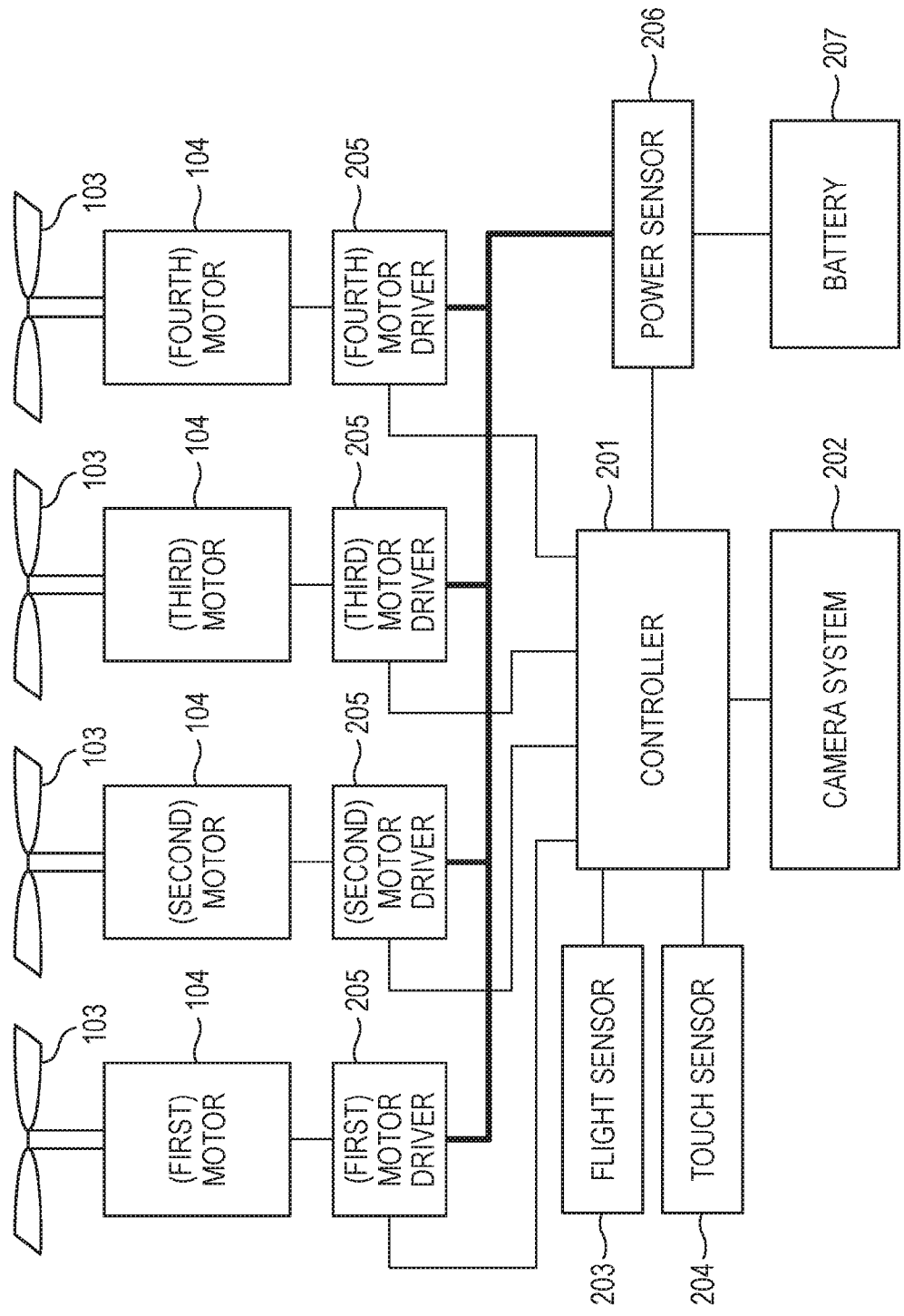
FIG. 2 is a view illustrating an example of the system configuration of the moving device according to the embodiment.

FIG. 2 is a view illustrating an example of the system configuration of the moving device 100 of the embodiment having the structure shown in FIG. 1. A controller 201 is connected to a camera system 202 including the camera 106 (see FIG. 1), a flight sensor 203 composed of various components such as acceleration sensors, a gyro sensor, and a GPS (global position system) sensor, a touch sensor 204 (a touch detection sensor unit), first to fourth motor drivers 205 for driving the first to fourth motors 104 (see FIG. 1), respectively, and a power sensor 206 for supplying electric power to the individual motor drivers 205 while monitoring the voltage of a battery 207. Here, the touch sensor 204 may be a push button or the like as long as it can detect touches. Also, although not particularly shown in the drawings, electric power of the battery 207 is also supplied to various control units for the controller 201, the camera system 202, the flight sensor 203, the touch sensor 204, the motor drivers 205, and the power sensor 206. The controller 201 acquires information on the posture of the airframe of the moving device 100 from the flight sensor 203 in real time. Also, the controller 201 uses the power sensor 206 to transmit power instruction signals to the first to fourth motor drivers 205 while monitoring the voltage of the battery 207. The power instruction signals depend on duty ratios based on pulse width modulation of the first to fourth motor drivers, respectively. As a result, the first to fourth motor drivers 205 control the rotation speeds of the first to fourth motors 104, respectively. Also, the controller 201 controls the camera system 202, thereby controlling an imaging operation of the camera 106 (FIG. 1). In the present embodiment, the controller 201 serves as an acquiring unit for acquiring a state when the moving device has been released from a holder, that is, when the moving device has been thrown by the holder, a determining unit for determining an imaging manner to control the camera system 202 and the camera 106 constituting the imaging unit after the moving device 100 has been released from the holder (the moving device has been thrown by the holder), based on the sate acquired by the acquiring unit, and an imaging control unit for controlling the camera 106 in the imaging manner determined by the determining unit, by the camera system 202.

The controller 201, the camera system 202, the flight sensor 203, the motor drivers 205, the power sensor 206, and the battery 207 shown in FIG. 2 are stored in the circuit box 105 contained in the main frame 101 of FIG. 1. Also, although not shown in FIG. 1, the touch sensor 204 is stuck on the main frame 101 and/or the motor frames 102 shown in FIG. 1, and detect the difference in the electrical physical quantity between when the main frame 101 or the motor frames 102 are being touched by thrower's fingers or the like and when the main frame and the motor frames are not being touched.

Hereinafter, operations of the moving device 100 having the above-described configuration will be described. First, examples of imaging modes of imaging manners of the present embodiment and examples of throwing manners corresponding to the imaging modes will be enumerated below. The imaging modes indicate a turning imaging mode, a spinning imaging mode, a self-timer imaging mode, an automatic follow-up imaging mode, and a normal imaging mode. Also, as another imaging mode, an imaging prohibition mode may be included.

<Example in which Turning Imaging Mode is Determined>

Figure 3:
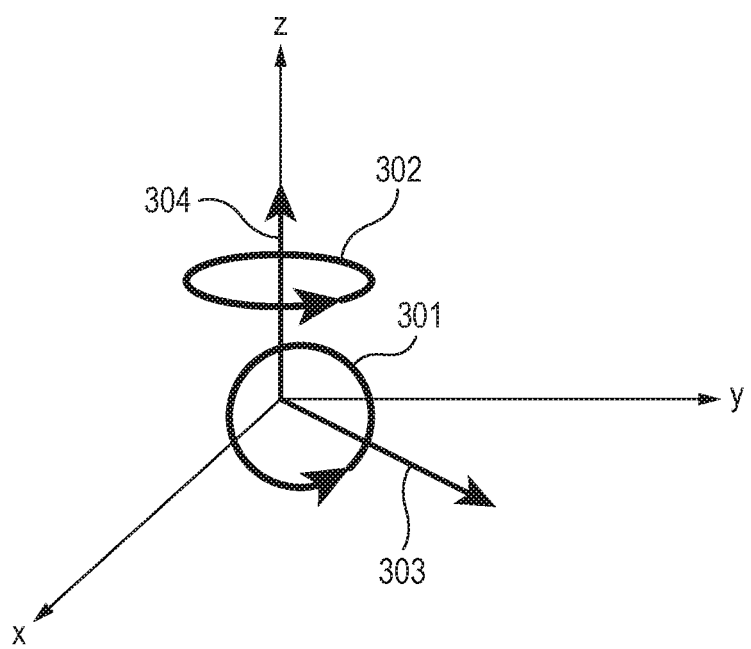
FIG. 3 is an explanatory view of throwing directions.

This mode is a mode for performing imaging while turning around the user having thrown. On the assumption that an x axis and a y axis are axes defined in a plane parallel to the ground, and a z axis is an axis perpendicular to the ground and directed to the sky, and the x axis, the y axis, and the z axis define a three-dimensional space as shown in FIG. 3, a throwing manner corresponding to the turning imaging mode is a manner of throwing the moving device while rotating the moving device around the x axis, or the y axis, or both of the x axis and the y axis, as shown by a reference symbol "301" in FIG. 3.

<Example in which Spinning Imaging Mode is Determined>

This mode is a mode in which the moving device 100 performs imaging while spinning on the z axis. A throwing manner corresponding to the spinning imaging mode is a manner of throwing the moving device while rotating the moving device on the z axis as shown by a reference symbol "302" in FIG. 3.

<Example in which Self-Timer Imaging Mode is Determined>

This mode is a mode of performing imaging by a self-timer after start of flight. A throwing manner corresponding to the self-timer imaging mode is a manner of taking a hand off the moving device without throwing, or lightly throwing up the moving device. The moving device is not rotated at an angular velocity exceeding a threshold. Since this mode is basically for performing imaging on the thrower, the moving device performs face detection, automatic focus adjustment, and the like. Also, in this mode, the moving device starts to fall down due to the force of gravity, and hovers against the force of gravity, thereby maintaining a fixed position.

<Example in which Automatic Follow-Up Imaging Mode is Determined>

This mode is a mode of performing imaging while automatically following the user having thrown. A throwing manner corresponding to the automatic follow-up imaging mode is a manner of turning the moving device upside down and then taking a hand off the moving device, or strongly throwing up the moving device in parallel to the z axis as shown by a reference symbol "304" in FIG. 3. The moving device is not rotated at an angular velocity exceeding a threshold.

<Example in which Normal Imaging Mode is Determined>

This mode is a mode of performing imaging while staying at a position to which the moving device has been thrown. A throwing manner of corresponding to r the normal imaging mode is a manner other than the above-described throwing manners for the other imaging modes. An example of such a throwing manner is a manner of throwing the moving device in a horizontal direction without rotating the moving device, although not shown in the drawings. Also, an interval at which continuous shooting is performed may depend on a velocity at which the moving device has been thrown.

Various imaging conditions such as a shutter speed, an aperture, an imaging interval, and an imaging timing of a still image or a video may be appropriately set for each mode, or may be fully automatically set. Also, imaging conditions may be set as one of the imaging modes, and be determined based on a state when the moving device has been thrown by (released from) the holder.

Figure 4:
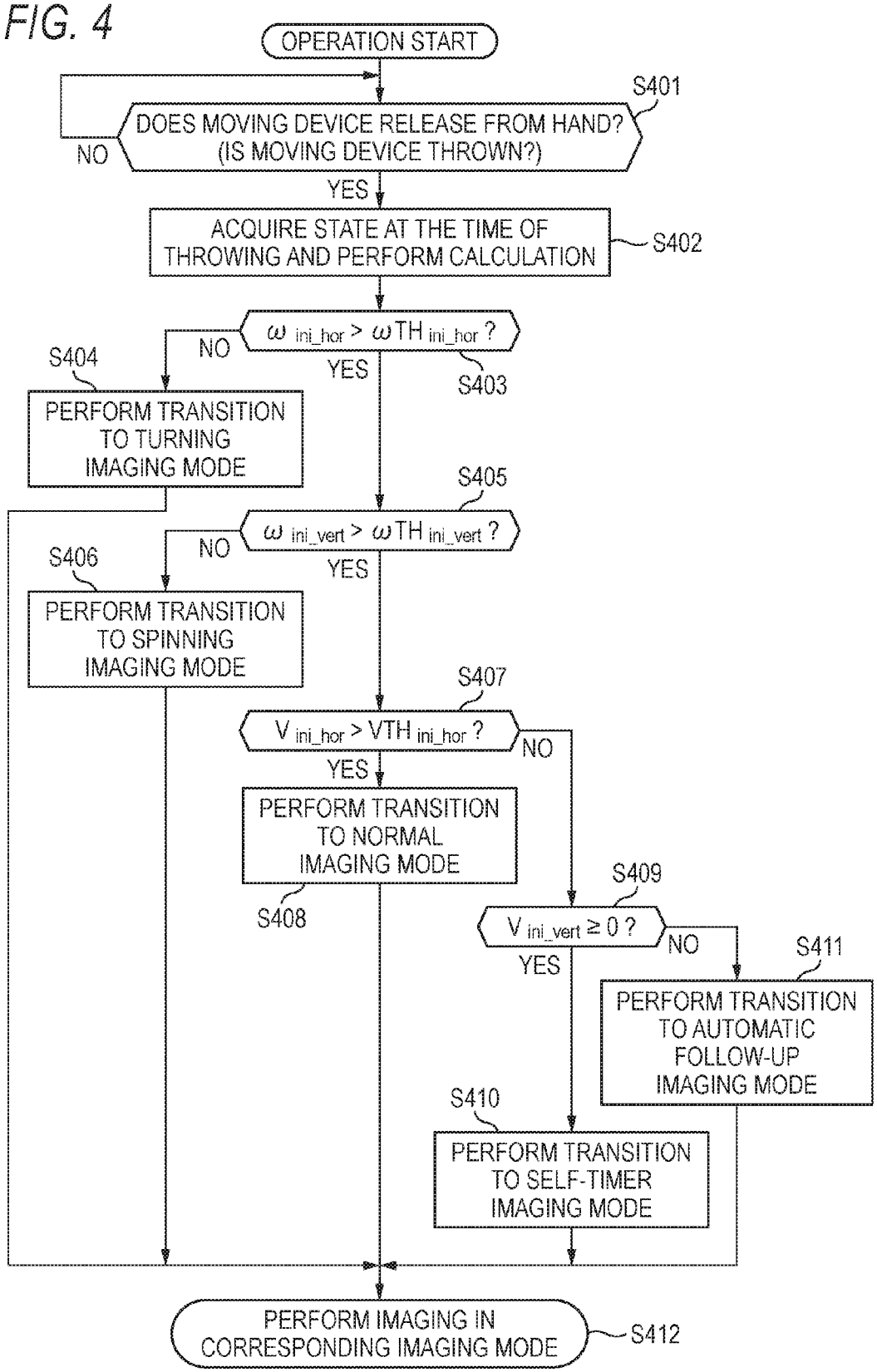
FIG. 4 is a flow chart illustrating an example of an imaging-mode control process of the moving device according to the embodiment.

FIG. 4 is a flow chart illustrating an example of an imaging-mode control process which is performed by the moving device 100 according to the present embodiment and is for making it possible to instruct any one of the above-described five imaging modes based on a throwing manner. This process can be implemented as a process in which a central processing unit (CPU) built in the controller 201 of FIG. 2 executes a control program stored in a memory (not particularly shown in the drawings) built in the controller in the controller.

First, the controller 201 monitors whether the moving device 100 has been released from (thrown by) by a hand of the user, for example, by monitoring a variation in the voltage of the touch sensor 204 (if the determination result of STEP S401 is "NO", the controller repeats STEP S401).

If the determination result of STEP S401 becomes "YES", in STEP S402, the controller 201 acquires the state at the time of having been thrown, based on outputs of the flight sensor 203, by calculation. Specifically, the controller 201 first acquires the angular velocities ωx, ωy, and ωz (rad/s (radian/second)) around the x axis, the y axis, and the z axis in the absolute coordinate system defined by the x axis, the y axis, and the z axis at the time of having been thrown, as output values related to the directions of the individual axes and output from the gyro sensor constituting the flight sensor 203. Subsequently, the controller 201 calculates an angular velocity ωini-hor around the x axis, the y axis, or both of the x axis and the y axis, that is, in the direction shown by a reference symbol "301" in FIG. 3, and an angular velocity ωini-vert around the z axis, that is, in the direction shown by a reference symbol "302" of FIG. 3, based on calculation processes equivalent to the following Expressions 1 and 2, respectively.

$$\omega_{ini} = \sqrt{\omega_x^2 + \omega_y^2 + \omega_z^2} \qquad \text{[Expression 1]}$$

$$\omega_{ini\_vert} = \omega_z \qquad \text{[Expression 2]}$$

Subsequently, the controller 201 calculates velocities Vx, Vy, and Vz (m/s (meter/second)) in the directions of the x axis, the y axis, and the z axis in the absolute coordinate system defined by the x axis, the y axis, and the z axis at the time of having been thrown. At this time, the controller 201 calculates the above-described velocities Vx, Vy, and Vz, based on acceleration values sensed in the directions of the individual axes at the time of having been thrown and output from the acceleration sensors constituting the flight sensor 203 of FIG. 2. If it is assumed that the accelerations sensed in the directions of the x axis, the y axis, and the z axis in the absolute coordinate system defined by the x axis, the y axis, and the z axis and output from the acceleration sensors are ax, ay, and az (m/s2), respectively, the controller 201 performs integration processes equivalent to the following Expressions 3, 4, and 5 on the accelerations ax, ay, and az from the time point is of start of the throwing when any one of the values of those accelerations exceeded a predetermined threshold, to the release time point tr when release of the moving device 100 from the body of the thrower was sensed based on the output of the touch sensor 204 of FIG. 2, thereby calculating the velocities Vx, Vy, and Vz in the directions of the individual axes at the time of having been thrown.

$$V_x = \int_{t_s}^{t_r} a_x \Delta t \qquad \text{[Expression 3]}$$

$$V_y = \int_{t_s}^{t_r} a_y \Delta t \qquad \text{[Expression 4]}$$

$$V_z = \int_{t_s}^{t_r} a_z \Delta t \qquad \text{[Expression 5]}$$

Subsequently, the controller 201 calculates an initial velocity Vini_hor around the x axis and the y axis, that is, in the horizontal direction shown by the reference symbol "303" in FIG. 3, and an initial velocity Vini_vert in the vertical direction shown by the reference symbol "304" in FIG. 3, based on calculation processes equivalent to the following Expressions 6 and 7, respectively.

$$V_{ini\_hor} = \sqrt{V_x^2 + V_y^2} \qquad \text{[Expression 6]}$$

$$V_{ini\_vert} = V_z \qquad \text{[Expression 7]}$$

After the process of STEP S402 described above, in STEP S403, the controller 201 determines whether the angular velocity ωini-hor calculated with respect to the direction shown by the reference symbol "301" of FIG. 3 in STEP S402 is larger than a threshold ωTHini-hor set in advance by a threshold setting process shown by a flow chart of FIG. 5 to be described below.

If the determination result of STEP S403 becomes "YES", the controller 201 sets the above-described turning imaging mode as an imaging mode in STEP S404, and then proceeds to an imaging process of STEP S412.

If the determination result of STEP S403 becomes "NO", subsequently, in STEP S405, the controller 201 determines whether the angular velocity ωini-vert calculated with respect to the direction shown by the reference symbol "302" of FIG. 3 in STEP S402 is larger than a threshold ωTHini-vert set in advance by the threshold setting process of the flow chart of FIG. 5 to be described below.

If the determination result of STEP S405 becomes "YES", the controller 201 sets the above-described spinning imaging mode as an imaging mode in STEP S406, and then proceeds to the imaging process of STEP S412.

If the determination result of STEP S405 becomes "NO", subsequently, in STEP S407, the controller 201 determines whether the initial velocity Vini_hor calculated with respect to the horizontal direction shown by the reference symbol "303" of FIG. 3 in STEP S402 is larger than a threshold VTHini_hor set in advance by the threshold setting process of the flow chart of FIG. 5 to be described below.

If the determination result of STEP S407 becomes "YES", the controller 201 sets the above-described normal imaging mode as an imaging mode in STEP S408, and then proceeds to the imaging process of STEP S412. In the normal imaging mode, the moving device shoots still images, series of images, or videos.

If the determination result of STEP S407 becomes "NO", subsequently, in STEP S409, the controller 201 determines whether the initial velocity Vini_vert calculated with respect to the vertical direction shown by the reference symbol "304" of FIG. 3 in STEP S402 is larger than 0 (or a threshold slightly larger than 0).

If the determination result of STEP S409 becomes "YES", the controller 201 sets the above-described self-timer imaging mode as an imaging mode in STEP S410, and then proceeds to the imaging process of STEP S412.

If the determination result of STEP S409 becomes "NO", the controller 201 sets the automatic follow-up imaging mode as an imaging mode in STEP S411, and then proceeds to the imaging process of STEP S412.

In the imaging process of STEP S412, the controller 201 controls the first to fourth motor drivers 204 such that they perform a flight operation in the set imaging mode, and then controls the camera system 202, thereby performing imaging.

Thereafter, although not particularly shown in the drawings, if imaging is performed for a predetermined time, or a predetermined number of times, or imagining finishes in response to an instruction from the user, the controller 201 searches for the position of the user (the owner) having thrown. As the searching method, an existing technology can be used. If the position of the owner is found, the controller 201 controls the first to fourth motor drivers 205 such that the moving device flies toward the owner until the controller determines whether the distance from the owner is equal to or less than a predetermined distance, based on GPS data and the like. Then, the controller 201 controls the first to fourth motor drivers 205 such that the motor drivers perform a hovering operation or an operation of landing on the hands of the thrower within the predetermined distance from the owner. In a case where a landing operation is performed, the controller stops the first to fourth motors, and finishes the control operation.

Figure 5:
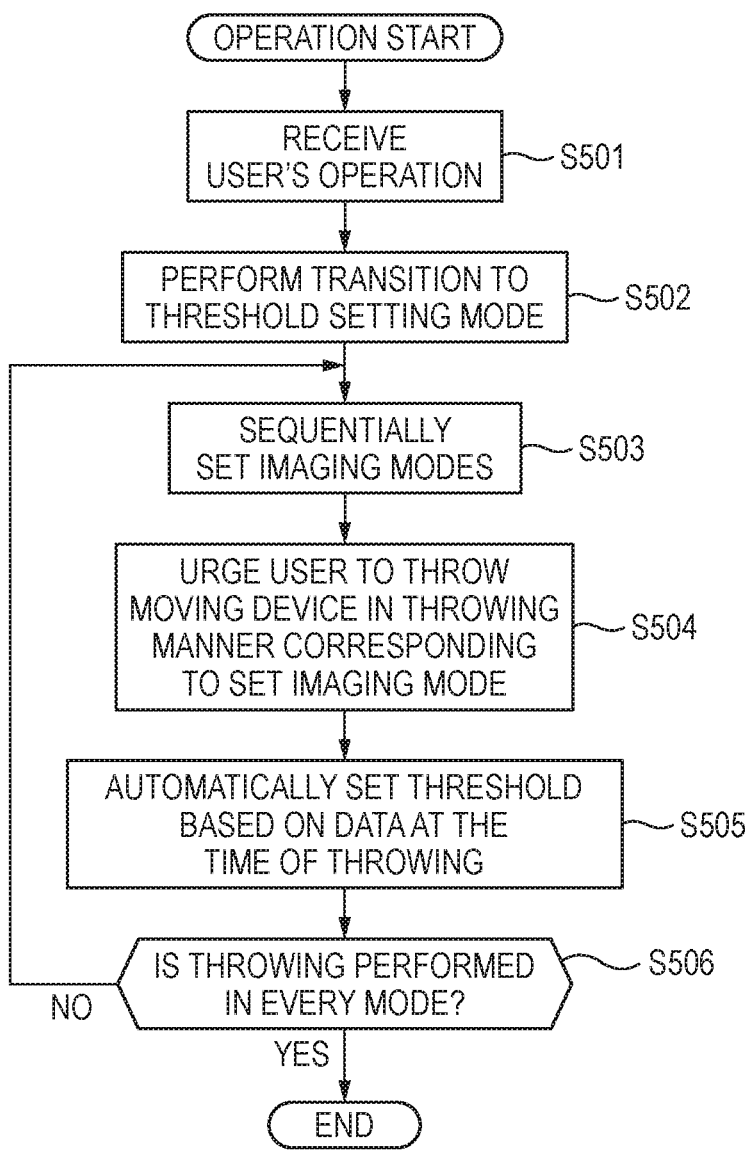
FIG. 5 is a flow chart illustrating an example of a process of setting thresholds for imaging manners according to the embodiment.

FIG. 5 is a flow chart illustrating an example of the process of setting thresholds for the imaging modes according to the present embodiment. First, if the controller 201 receives a predetermined switch operation or the like from the user in STEP S501, in STEP S502, the controller performs a transition to a threshold setting mode.

Subsequently, in STEP S503, the controller 201 sets a mode which is one of the above-described imaging modes and for which a threshold has not been set.

Subsequently, in STEP S504, the controller 201 urges the user to throw the moving device in a throwing manner corresponding to the imaging mode set in STEP S503.

Subsequently, in STEP S505, the controller 201 calculates the angular velocity ωini-hor in the direction shown by the reference symbol "301" of FIG. 3, the angular velocity ωini-vert in the direction shown by the reference symbol "302" of FIG. 3, the initial velocity Vini_hor in the horizontal direction shown by the reference symbol "303" of FIG. 3, and the initial velocity Vini_vert in the vertical direction shown by the reference symbol "304" of FIG. 3, as the results of the throwing of STEP S504, based on processes similar to those in STEP S402 of FIG. 4 described above (calculation processes equivalent to Expressions 1 to 7). Then, the controller 201 automatically sets values obtained by changing the calculated values by predetermined amounts, as thresholds ωTHini-hor, ωTHini-vert, VTHini_hor, and VTHini_vert, respectively.

Thereafter, in STEP S506, the controller 201 determines whether the series of the processes of STEPS S503 to S505 has finished with respect to every imaging mode.

If the determination result of STEP S506 becomes "NO", the controller 201 returns to the process of STEP S503, thereby proceeding to the process for the next unprocessed imaging mode.

If the determination result of STEP S506 becomes "YES", the controller 201 finishes the process of setting thresholds for the imaging modes shown by the flow chart of FIG. 5.

According to the above-described embodiment, it becomes possible to easily determine an imaging manner as intended by the thrower at the timing of throwing.

Now, an embodiment representing examples of imaging conditions for the imaging manners and examples of throwing manners corresponding to the imaging conditions will be described. Here, the imaging conditions include a shutter speed, an aperture, an imaging interval, and an imaging timing of a still image or a video. In the above-described embodiment, the description has been made on the assumption that all of the imaging conditions are automatically determined. However, in the present embodiment, the state of the flight device 100 at the moment when the flight device has been released from the holder is acquired from various sensors included in the flight sensor 203 of FIG. 2, and on the basis of the acquired state, imaging conditions for the time after the flight device 100 has been released from a hand of the holder or after the thrower has thrown the flight device 100 are determined.

In the present embodiment, similarly in the above-described embodiment, on the assumption that an x axis and a y axis are axes defined in a plane parallel to the ground, and a z axis is an axis perpendicular to the ground and directed to the sky, and the x axis, the y axis, and the z axis define a three-dimensional space as shown in FIG. 3, the controller 201 calculates the velocities Vx, Vy, and Vz (m/s (meter/second)) in the directions of the x axis, the y axis, and the z axis in the absolute coordinate system defined by the x axis, the y axis, and the z axis at the time of having been thrown. If acceleration values ax, ay, and az in the directions of the individual axes are output from acceleration sensors constituting the flight sensor 203 of FIG. 2, the controller 201 performs integration processes equivalent to the above-described Expressions 3, 4, and 5 on the accelerations ax, ay, and az from the time point ts of start of the throwing when any one of the values of those accelerations exceeded a predetermined threshold, to the release time point tr when release of the flight device 100 from the body of the thrower was sensed on the basis of the output of the touch sensor 204 of FIG. 2, thereby calculating the velocities Vx, Vy, and Vz. In the present embodiment, on the basis of those velocities, imaging conditions are determined as follow.

<Example in which Imaging Condition on Shutter Speed is Determined>

For example, in a case where it is desired to acquire as tack-sharp an image as possible after throwing, it is desired to set a high shutter speed. In contrast, in a case where it is desired to acquire an image with motion blur, it is desired to set a low shutter speed. According to a throwing manner for controlling the shutter speed, as the sum of the velocities Vx, Vy, and Vz in the individual directions increases, a higher shutter speed is set. In other words, regardless of the direction in which the flight device is thrown, as the speed at which (the force with which) the flight device is thrown increases, the shutter speed increases. This control on the shutter speed may be linked with the aperture to be described below.

<Example in which Imaging Condition on Aperture is Determined>

For example, in a case where it is desired to acquire as sharp an image as possible after throwing, it is desired to narrow the aperture. In contrast, in a case where it is desired to acquire a soft image, it is desired to widen the aperture. According to a throwing manner for controlling the aperture, the average of the velocities Vx, Vy, and Vz in the individual directions increases, the aperture is narrowed. In other words, regardless of the direction in which the flight device is thrown, as the speed at which (the force with which) the flight device is thrown increases, the aperture is narrowed. This control on the aperture may be linked with the above-described shutter speed.

<Example in which Imaging Condition on Imaging Interval is Determined>

In a case where it is desired to perform imaging at intervals of a time or at intervals of a distance, it is desired to determine the imaging interval. According to a throwing manner for controlling the imaging interval, as the product of the velocities Vx and Vy in the individual directions when the flight device is thrown while the flight device is rotated on the z axis as shown by the reference symbol "302" in FIG. 3, similarly in the spinning imaging mode, increases, the imaging interval is set to be long. In short, if the flight device is thrown slowly, a large number of images are acquired; whereas if the flight device is thrown fast, a small number of images are acquired. The velocity in the direction of the z axis is not considered. Needless to say, the velocity and the imaging interval may have the inverse relation of the above-described relation.

<Example in which Imaging Condition on Imaging Timing is Determined>

In a case where it is desired to perform imaging at the highest point, the user slowly throws the flight device in the direction of the z axis, that is, straight up into the air.

In a case where it is desired to perform imaging when the user is in the angle of view, similarly in the above-described turning imaging mode, the user throws the flight device while rotating the flight device around the x axis, or the y axis, or both of the x axis and the y axis, as shown by the reference symbol "301" in FIG. 3.

In a case where it is desired to perform imaging when a desired object is in the angle of view, the user throws the flight device toward the desired object such that the flight device forms a parabola. In this case, which of the directions of the x axis, the y axis, and the z axis the flight device proceeds in is unclear, however, if it is detected that the flight trajectory is at least a parabola, the controller 201 determines a main object in the angle of view in the direction of the trajectory of the parabola, and focuses on that main object, and acquires one or more images.

The controller 201 performs, for example, calculations equivalent to the following Expressions, thereby calculating the trajectory of the parabola, thereby determining a main object in the angle of view in the direction of the calculated parabola trajectory.

First, it is assumed that an initial velocity and the gravity acceleration are $V_0$ (m/s) and g (m/s$^2$), and it is assumed that the elevation angle of the initial velocity during oblique projection is θ (rad), and a time elapsed from the throwing start time point is t. In this case, the velocity Vxy and displacement xy in the horizontal plane defined by the x axis and the y axis are calculated by the following Expressions 8 and 9.

$$V_{xy} = V_0 \cos \theta \qquad \text{[Expression 8]}$$

$$xy = V_0 \cos \theta \cdot t \qquad \text{[Expression 9]}$$

Also, the velocity and displacement in the vertical direction are calculated by the following Expressions 10 and 11.

$$V_z = V_0 \sin \theta - gt \qquad \text{[Expression 10]}$$

$$V_z = V_0 \sin \theta \cdot t - \tfrac{1}{2} gt^2 \qquad \text{[Expression 11]}$$

In the present embodiment, if determining that the elevation angle θ during throwing at the initial velocity $V_0$ falls in a predetermined range, the controller 201 determines that the flight device has been thrown such that it forms a parabola, and calculates the trajectory of the parabola by Expressions 8 to 11 described above, thereby determining a main object in the angle of view in the direction of the calculated parabola trajectory.

Figure 6:
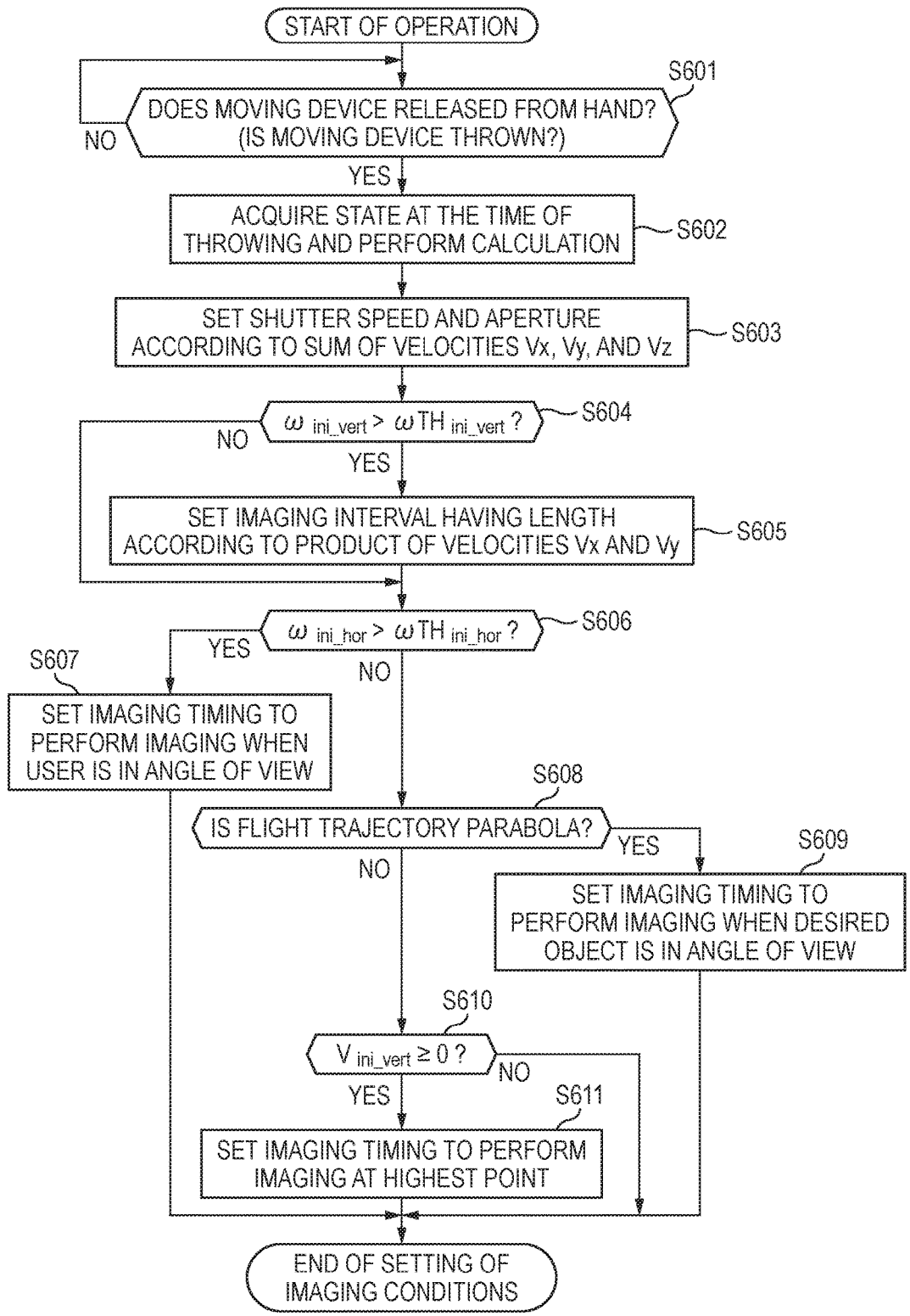
FIG. 6 is a flow chart illustrating an example of an imaging-condition control process of the flight device according to the embodiment.

FIG. 6 is a flow chart illustrating an example of an imaging-condition control process of the flight device 100 of the present embodiment for making it possible to designate any one of the above-described four imaging conditions by a throwing manner. This process can be implemented as a process in which the CPU built in the controller 201 of FIG. 2 executes a control program stored in a memory (not particularly shown in the drawings) built in the controller, in the controller.

First, the controller 201 monitors whether the flight device 100 has been released from (thrown by) by a hand of the user, for example, by monitoring a variation in the voltage of the touch sensor 204 (if the determination result of STEP S601 is "NO", the controller repeats STEP S601).

If the determination result of STEP S601 becomes "YES", in STEP S602, the controller 201 acquires the state at the time of having been thrown, on the basis of outputs of the flight sensor 203, by calculation. Specifically, the controller 201 first acquires the angular velocities ωx, ωy, and ωz (rad/s (radians/second)) around the x axis, the y axis, and the z axis in the absolute coordinate system defined by the x axis, the y axis, and the z axis, as output values related to the directions of the individual axes and output from the gym sensor constituting the flight sensor 203. Subsequently, the controller 201 calculates an angular velocity ωini-hor around the x axis, the y axis, or both of the x axis and the y axis, that is, in the direction shown by the reference symbol "301" in FIG. 3, and an angular velocity ωini-vert around the z axis, that is, in the direction shown by the reference symbol "302" of FIG. 3, on the basis of calculation processes equivalent to the above-described Expressions 1 and 2, respectively.

Subsequently, the controller 201 calculates velocities Vx, Vy, and Vz (m/s (meta(s)/second)) in the directions of the x axis, the y axis, and the z axis in the absolute coordinate system defined by the x axis, the y axis, and the z axis at the time of having been thrown by performing integration processes equivalent to the above-described Expressions 3, 4, and 5 as described above, and then calculates the sum of the velocities Vx, Vy, and Vz.

Subsequently, the controller 201 calculates the initial velocity Vini_vert around the z axis, that is, in the vertical direction shown by the reference symbol "304" in FIG. 3, on the basis of a calculation process equivalent to the above-described Expression 7.

After the process of STEP S602 described above, the controller 201 sets both or a predetermined one of the shutter speed and the aperture according to the sum of the velocities Vx, Vy, and Vz calculated in STEP S602.

Subsequently, in STEP S604, the controller determines whether the angular velocity ωini-vert calculated with respect to the direction shown by the reference symbol "302" of FIG. 3 in STEP S602 is larger than the threshold ωTHini-vert set in advance by the threshold setting process of the flow chart of FIG. 5 described above.

If the determination result of STEP S604 is "YES", in STEP S605, the controller 201 sets the imaging interval to a length according to the product of the velocities Vx and Vy calculated in STEP S602. If the determination result of STEP S604 is "NO", the controller 201 skips the process of STEP S605.

Thereafter in STEP S606, the controller 201 determines whether the angular velocity aωini-hor calculated with respect to the direction shown by the reference symbol "301" of FIG. 3 in STEP S602 is larger than the threshold ωTHini-hor set in advance by the threshold setting process shown by the flow chart of FIG. 5 described above.

If the determination result of STEP S606 is "YES", in STEP S607, the controller 201 sets an imaging timing to perform imaging when the user is in the angle of view. The controller determines whether the user is in the angle of view, for example, on the basis of a recognition result of a face recognizing process using image information obtained from the camera system 202 of FIG. 2. Alternatively, the user may have a remote controller having a beacon signal transmitting function. In this case, if the beacon signal is caught, the controller determines that the user is in the angle of view. Thereafter, the controller 201 finishes the imaging-condition control process shown by the flow chart of FIG. 6.

If the determination result of STEP S606 is "NO", in STEP S608, the controller 201 determines whether the elevation angle θ during throwing at the initial velocity $V_0$ falls in the predetermined range, thereby determining whether the flight trajectory is a parabola.

If the determination result of STEP S608 is "YES", in STEP S609, the controller 201 sets an imaging timing to perform imaging when a desired object is in the angle of view. In this case, the controller 201 calculates the trajectory of the parabola, for example, by Expressions 8 to 11 described above, thereby determining a main object in the angle of view in the direction of the calculated parabola trajectory. The controller determines a main object, for example, by an image recognizing process in the above-described angle of view included in image information obtained from the camera system 202 of FIG. 2. Thereafter, the controller 201 finishes the imaging-condition control process shown by the flow chart of FIG. 6.

If the determination result of STEP S608 is "NO", in STEP S610, the controller 201 determines whether the initial velocity Vini_vert calculated in STEP S602 with respect to the vertical direction shown by the reference symbol "304" in FIG. 3 is larger than 0 (or a threshold slightly larger than 0).

If the determination result of STEP S610 is "YES", the controller 201 sets an imaging timing to perform imaging at the highest point. Thereafter the controller 201 finishes the imaging-condition control process shown by the flow chart of FIG. 6.

If the determination result of STEP S610 is "NO", the controller 201 finishes the imaging-condition control process shown by the flow chart of FIG. 6.

After finishing the imaging-condition control process shown by the flow chart of FIG. 6, the controller 201 can perform the imaging-mode control process shown by the flow chart of FIG. 4 described above, and perform an imaging process in STEP S412 of FIG. 4.

Hereinafter, a different embodiment of the imaging-condition control process will be described. In the different embodiment, the user practically throws the flight device at various initial velocities (with various forces) in advance such that the flight device form a parabola, and stores the relation of each of the initial velocities (forces), a shutter speed, and an aperture which is automatically set on the basis of the shutter speed such that proper exposure is performed, as an initial-velocity shutter-speed correspondence table. Thereafter, the user can throw the flight device at a desired initial velocity such that the flight device forms a parabola and performs imaging with a desired shutter speed and an aperture automatically set on the basis of the shutter speed.

Figure 7:
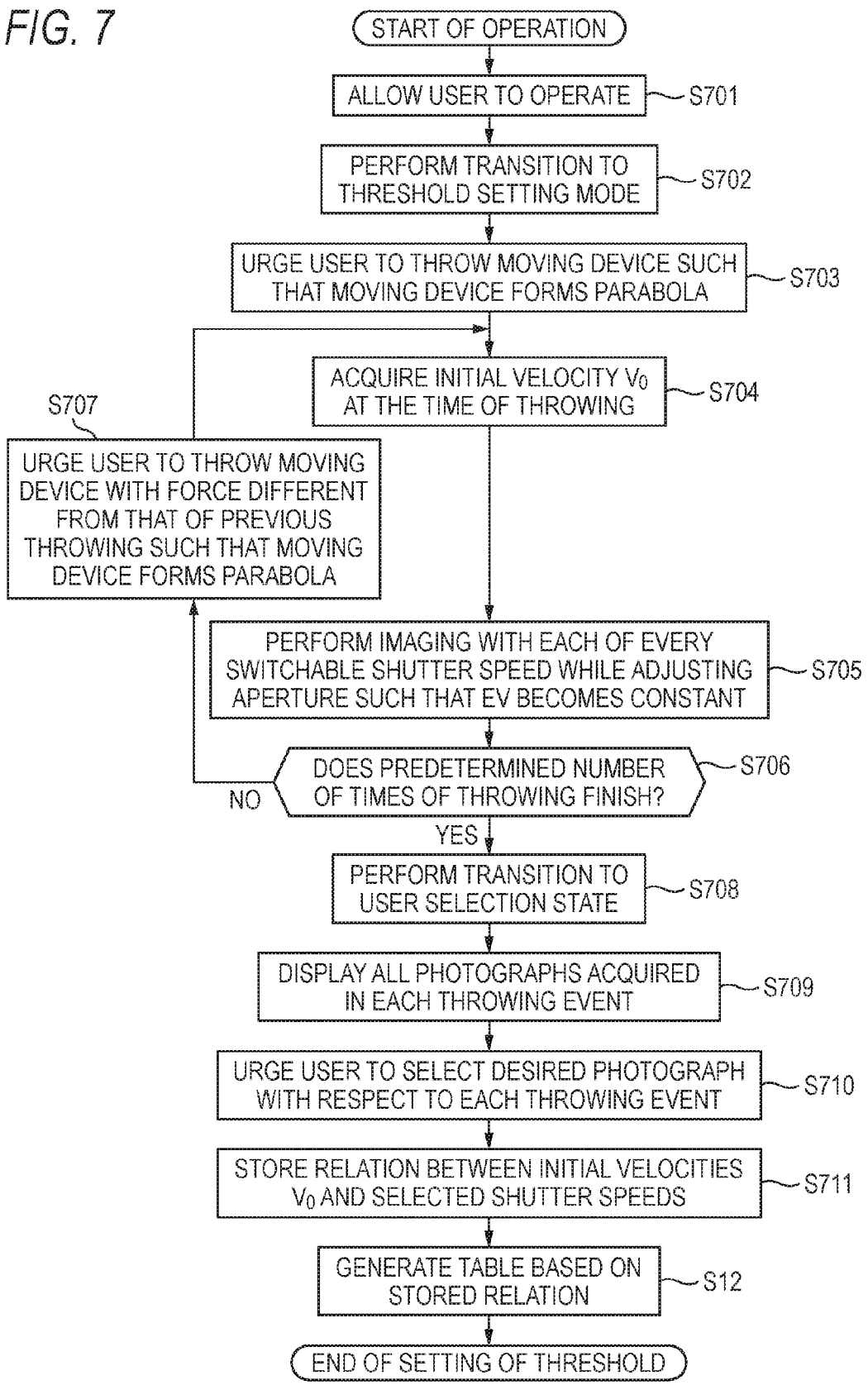
FIG. 7 is a flow chart illustrating a process of generating an initial-velocity shutter-speed correspondence table according to a different embodiment of the imaging-condition control process of the flight device.

FIG. 7 is a flow chart illustrating a process of generating an initial-velocity shutter-speed correspondence table according to the different embodiment of the imaging-condition control process of the flight device 100. Similarly to the case of FIG. 6, this process can be implemented as a process in which the CPU built in the controller 201 of FIG. 2 executes a control program stored in a memory (not particularly shown in the drawings) built in the controller, in the controller.

First, if the controller 201 receives a user's operation in STEP S701, in STEP S702, the controller performs a transition to the threshold setting mode.

Subsequently, in STEP S703, the controller 201 urges the user to throw the flight device such that the flight device forms a parabola.

Then, in STEP S704, the controller 201 acquires the initial velocity $V_0$ at the time of throwing.

In STEP S705, when the thrown flight device 100 flies, the controller 201 controls the camera system 202 such that the camera system performs imaging with each of every switchable shutter speed while adjusting the aperture such that the exposure value (EV) becomes constant, and records the results in the memory included in the controller 201. FIG. 8 is a view illustrating an example of a table representing the relation of EV, shutter speed, and aperture stored in advance in a read only memory (ROM) included in the controller 201. For example, if the EV is 13, as the shutter speed changes ⅛ s to ½₀₀₀ s, the aperture changes from 32 to 2.0. In STEP S705, for example, after the EV is automatically set to 13, while gradually changing the shutter speed from ⅛ s to ½₀₀₀ s, the controller 201 determines an aperture corresponding to the changed shutter speed with reference to the above-described relation table stored in the ROM, and controls the camera system 202 such that the camera system performs imaging with the combination of the shutter speed and the aperture determined, and records the obtained image data in a random access memory (RAM) included in the controller 201.

Thereafter, in STEP S706, the controller 201 determines whether a predetermined number of times of throwing has finished.

If the determination result of STEP S706 is "NO", in STEP S707, the controller urges the user to throw the flight device at an initial velocity (with a force) different from that of the previous throwing such that the flight device forms a parabola. Thereafter, the controller 201 re-performs the processes of STEPS S704 and S705.

After the above-described operation is repeated, if the determination result of STEP S706 becomes "YES", in STEP S708, the controller 201 performs a transition to a user selection state.

Subsequently, in STEP S709, the controller 201 transmits all photographs recorded in the RAM included in the controller 201 in STEP S705, to a smart phone or a display of a mode controller (not particularly shown in the drawings), such that the photographs are displayed.

Whenever the flight device is thrown, in STEP S710, the controller 201 urges the user to select a desired photograph.

Whenever the flight device is thrown, in STEP S711, the controller 201 stores the relation between the initial velocity $V_0$ and the shutter speed of a photograph selected by the user, in the internal RAM. The controller generates an initial-velocity shutter-speed correspondence table, for example, as shown in FIG. 9, on the basis of the stored relation, and stores the generated table in the RAM. Thereafter, the controller 201 finishes the threshold setting process shown by the flow chart of FIG. 7.

After the above-described threshold setting process finishes, the user can throw the flight device at a desired initial velocity such that the flight device forms a parabola and performs imaging with a desired shutter speed and an aperture automatically set on the basis of the shutter speed.

In the above-described embodiment, an imaging mode is determined based on the angular velocities and the velocities. However, an imaging mode may be determined based on the accelerations.

In the above-described embodiment, the number of still images which the moving device 100 takes is arbitrary. Also, moving device 100 can acquire not only still images but also videos by imaging. In this case, the shooting times of videos are arbitrary.

The moving device 100 may transmit an acquired video, for example, to a terminal held by the thrower, by communication, such that the thrower can shoot while seeing the video.

The imaging timings and the like of the moving device 100 may be wirelessly controlled, for example, by operations on a thrower's terminal.

In a case of using a mechanism for folding the motor frames 102 to make the moving device 100 portable, a process of transforming the motor frames 102 into a flyable state may be performed immediately after throwing.

In the above description of the embodiment, the example in which the propelling units include the motors 104 and the rotor blades 103 has been described. However, the propelling units may be implemented by a mechanism which is propelled by air pressure or engine power. Also, the moving device may free-fall without having any propelling unit. In some states, the moving device may not perform imaging. Further the moving device may be just released from a hand, without being thrown.

In the above description of the embodiment, the moving device (a flight device) which is released by a user and flies by driving rotor blades has been described as one example. However, the moving device may include a moving device which moves above ground, on water or under water such as a ball of bowling, an automobile, a boat, a submarine, an underwater camera and so on.

What is claimed is:

1. A moving device comprising:
   an imaging device;
   a flight sensor; and
   a hardware processor which executes processes comprising:
   an acquiring process of acquiring a state of the moving device at a time when the moving device is released from a user, based on angular velocities, accelerations, or velocities of the moving device detected by the flight sensor at the time when the moving device is released from the user;
   a determining process of determining an imaging manner in which to control the imaging device after the time when the moving device is released from the user, based on results of comparisons between (i) values calculated based on respective output values output from the flight sensor at the time when the moving device is released from the user and (ii) respective predetermined thresholds; and
   an imaging control process of controlling the imaging device in the imaging manner determined in the determining process.

2. The moving device according to claim 1, wherein the determining process determines the imaging manner in which to control the imaging device after the time when the moving device is released by the user, when the moving device is released by the user by being thrown by the user.

3. The moving device according to claim 1, wherein the imaging manner comprises one of an imaging mode and an imaging condition.

4. The moving device according to claim 3, wherein the imaging mode includes at least one of turning imaging, spinning imaging, self-timer imaging, automatic follow-up imaging, normal imaging, and imaging prohibition.

5. The moving device according to claim 3, wherein the imaging condition includes at least one of a shutter speed, an aperture, an imaging interval, and an imaging timing of a still image or a video.

6. The moving device according to claim 1, wherein in a case where only acceleration in the direction of the force of gravity is detected by the flight sensor, when the state of the moving device is acquired at the time when the moving device is released from the user, the determining process determines an imaging mode for self-timer imaging as the imaging manner.

7. The moving device according to claim 1, wherein:
   the flight sensor outputs the output values of the angular velocities, accelerations, or velocities in the direction of individual coordinate axes of a predetermined absolute coordinate system at the time when the moving device is released from the user,
   the determining process calculates values of the angular velocities, the accelerations, or the velocities in the directions of the coordinate axes parallel to or perpendicular to the ground, based on the output values output from the flight sensor at the time when the moving device is released from the user, or based on calculation processes performed based on the output values, and
   the determining process compares the calculated values with the respective predetermined thresholds, and determines the imaging manner to control the imaging device based on results of the comparisons.

8. The moving device according to claim 1, wherein in a case where the user throws the moving device for each of a plurality of imaging manners in advance, the determining process (i) obtains values by changing, by predetermined amounts, respective values which are based on the respective output values output from the flight sensor at the time when the moving device is thrown, and (ii) automatically sets the obtained values as the respective predetermined thresholds.

9. The moving device according to claim 1, further comprising at least one propeller that is configured to drive the moving device to fly in the air after the time when the moving device is released from the user.

10. The moving device according to claim 9, wherein in a case where the acquiring process acquires, as the state of the moving device at the time when the moving device is released from the user, a state where the moving device stays at a place, the at least one propeller drives the moving device to hover at said place.

11. An imaging method of a moving device having an imaging device and a flight sensor, the method comprising:
    acquiring a state of the moving device at a time when the moving device is released from a user, based on angular velocities, accelerations, or velocities of the moving device detected by the flight sensor at the time when the moving device is released from the user;
    determining an imaging manner in which to control the imaging device after the time when the moving device is released from the user, based on results of comparisons between (i) values calculated based on respective output values output from the flight sensor at the time when the moving device is released from the user and (ii) respective predetermined thresholds; and
    controlling the imaging device in the imaging manner determined in the determining.

12. A non-transitory computer readable storage medium storing a program for controlling a computer of a moving device having an imaging device and a flight sensor to cause the computer to perform operations comprising:
    acquiring a state of the moving device at a time when the moving device is released from a user, based on angular velocities, accelerations, or velocities of the moving device detected by the flight sensor at the time when the moving device is released from the user;
    determining an imaging manner in which to control the imaging device after the time when the moving device is released from the user, based on results of comparisons between (i) values calculated based on respective output values output from the flight sensor at the time when the moving device is released from the user and (ii) respective predetermined thresholds; and
    controlling the imaging device in the imaging manner determined in the determining.

13. The moving device according to claim 1, wherein the flight sensor comprises an acceleration sensor and a gyro sensor.

* * * * *